United States Patent [19]

McClaflin

[11] 4,235,712
[45] Nov. 25, 1980

[54] REMOVAL OF ANIONIC SURFACTANTS FROM WATER

[75] Inventor: Gifford G. McClaflin, Ponca City, Okla.

[73] Assignee: Conoco, Inc., Ponca City, Okla.

[21] Appl. No.: 27,211

[22] Filed: Apr. 5, 1979

[51] Int. Cl.$^3$ .............................................. C02F 1/26
[52] U.S. Cl. .................................... 210/708; 210/683; 210/639; 210/749
[58] Field of Search .................. 210/21, 42 R, 43, 44, 210/49, 51–54, 59; 252/303, 312, 349

[56] References Cited

U.S. PATENT DOCUMENTS

| | | | |
|---|---|---|---|
| 3,215,621 | 11/1965 | White et al. | 210/21 |
| 3,247,103 | 4/1966 | Shang | 210/21 |
| 3,247,104 | 4/1966 | Sako et al. | 210/21 |
| 3,485,752 | 12/1969 | Eck et al. | 210/54 |
| 3,779,907 | 12/1973 | Li et al. | 210/59 |
| 3,994,943 | 11/1976 | Gibble et al. | 210/21 |
| 4,092,242 | 5/1978 | Deane | 210/51 |

Primary Examiner—Charles N. Hart
Assistant Examiner—Peter A. Hruskoci
Attorney, Agent, or Firm—Bayless E. Rutherford, Jr.

[57] ABSTRACT

A method of removing specific water-soluble anionic surfactants from water is disclosed. Briefly, the method comprises forming an emulsion by adding a nonionic surfactant and a hydrocarbon to the water and anionic surfactant. The emulsion is broken, with the anionic and nonionic surfactant being present in the hydrocarbon layer.

16 Claims, No Drawings

REMOVAL OF ANIONIC SURFACTANTS FROM WATER

FIELD OF THE INVENTION

The invention is in the field of removing specific anionic surfactants from water.

GENERAL BACKGROUND

Alkali metal salts of low molecular weight alkylaryl sulfonates are very soluble in water. In fact, due to their strong solubility it is difficult to separate these sulfonates from water except by means such as distillation and chromatographic techniques.

There are many uses for this type of sulfonate in water. In general the uses do not require removal of the sulfonate from the water. However, there are instances where it is desirable to remove the sulfonate from water. For example, when the sulfonate is causing foaming problems in lakes or other bodies of water it is desirable to remove it.

I have discovered a novel way of removing alkali metal salts of low molecular weight alkaryl sulfonates from water. My method is applicable, also, to certain water soluble fatty acid salts, e.g. sodium palmitate.

BRIEF SUMMARY OF THE INVENTION

A method of removing specific water-soluble anionic surfactants from water, said method comprising:
(a) forming an emulsion of the water containing the anionic surfactant by adding an effective amount of nonionic surfactant and hydrocarbon,
(b) breaking the emulsion of step (a) thereby forming an aqueous layer and a hydrocarbon layer which contains the nonionic surfactant and substantially all of the anionic surfactant, and
(c) separating the aqueous layer and the hydrocarbon layer.

DETAILED DESCRIPTION

My method is useful for removing the following anionic surfactants from water: (a) alkali metal salts of alkaryl sulfonates, said sulfonates having equivalent weights in the range of about 250 to about 500, preferably from about 300 to about 400, and (b) alkali metal salts of fatty acids containing from 12 to 18, preferably 16 to 18, carbon atoms. Sodium salts of alkylbenzene sulfonates having the requisite equivalent weight and sodium salts of the fatty acids are particularly suitable.

The amount of anionic surfactant in the water is usually in the range of about 0.001 to about 10 percent by weight, more usually in the range of about 0.005 to about 2 percent by weight.

Suitable nonionic surfactants for use in my invention include alkoxylated alcohols and alkoxylated mono- and di-alkyl phenols. Suitable alkoxylated alcohols include both primary and secondary alcohols wherein the alcohol moiety contains about 10 to about 20 carbon atoms, preferably about 12 to about 14 carbon atoms. The alkoxy groups can contain about 2 to about 4 carbon atoms, but preferably is ethoxy. The number of alkoxy groups present in the compound can be in the range of about 10 to about 100, preferably from about 30 to about 70.

Suitable alkoxylated alkyl phenols are mono- or di-alkyl phenols wherein each alkyl group contains from about 8 to about 12 carbon atoms. The alkoxy groups contain about 2 to about 4 carbon atoms, but preferably contain 2 carbon atoms. The alkoxylated alkyl phenol contains from about 20 to about 100 alkoxy groups, preferably from about 30 to about 70 alkoxy groups.

Any liquid hydrocarbon, at ambient temperature, is suitable for use in my invention. Examples of suitable hydrocarbons include hexane, heptane, octane, benzene, kerosene, gasoline and crude oil. Because of cost and availability crude oil is a preferred hydrocarbon.

A suitable amount of nonionic surfactant to anionic surfactant is in the range of about 0.1 to about 10 parts by weight, with the preferred amount being about 0.5 to about 1 part by weight.

A suitable amount of hydrocarbon to aqueous solution of anionic surfactant is in the range of about 0.1 to about 10 parts by volume; preferably, the amount is in the range of about 0.5 to about 2.

In conducting my process the nonionic and hydrocarbon are added to the aqueous solution of anionic surfactant. If necessary, the resulting admixture is agitated to form an emulsion. The resulting emulsion is then broken using conventional means. Examples of suitable means of breaking the emulsion include centrifugation, heating and adding an emulsion breaker. Commercial emulsion breakers are available. Upon breaking the emulsion an aqueous phase and a hydrocarbon phase forms. The anionic surfactant is in the hydrocarbon phase.

In order to illustrate the nature of the present invention still more clearly the following examples will be given. It is to be understood, however, that the invention is not to be limited to the specific conditions or details set forth in these examples except insofar as such limitations are specified in the appended claims.

EXAMPLES 1—3

MATERIALS USED

Water: a synthetic hard water containing 5,000 ppm total hardness.
Hydrocarbon: Goodwin Lease Crude Oil from Cat Canyon Oil Field, Santa Maria, California.
Anionic Surfactant: sodium alkylbenzene sulfonate having an equivalent weight of about 334. The material used was 52.35 weight percent active.
Nonionic Surfactant A: an ethoxylated octylphenol containing 30 moles of ethylene oxide per mole of octylphenol. The material was 70 percent active.
Nonionic Surfactant B: an ethoxylated octylphenol containing 70 moles of ethylene oxide per mole of octylphenol. The material was 100 percent active.

Procedure

Three compositions were prepared containing the following:
Composition A: 0.114 gram Anionic Surfactant. Water was added to 300 grams.
Composition B: 0.057 gram of the Anionic Surfactant and 0.03 gram of Nonionic Surfactant B. Water was added to 300 grams.
Composition C: 0.057 gram Anionic Surfactant, 0.02 gram Nonionic Surfactant A, 0.015 gram Nonionic Surfactant B. Water was added to 300 grams.

The compositions were divided into two portions. One portion was saved for sulfonate analysis and the other portion was contacted with an equal weight of the crude oil at 170° F. The resulting admixture was then shaken in a sealed container, transferred to centrifuge tubes, and allowed to cool at room temperature. Then they were centrifuged at 2,200 rpm for one half hour.

Centrifuging produced an upper aqueous layer and a lower crude oil layer and in each case 90 percent of the water was recovered.

The original solution and the water solution recovered from the crude oil/water emulsion were then analyzed for sulfonate content using the standard methylene blue test.

The results of these tests are shown in Table I.

TABLE I

| Composition | Sulfonate Analysis on Original (ppm) | Composition of Emulsion | Sulfonate Analysis on Water Recovered From Emulsion (ppm) |
| --- | --- | --- | --- |
| A | 210 | Composition A (50 g) Viscous Crude Oil (50 g) | 61 |
| B | 111 | Composition B (50 g) Viscous Crude Oil (50 g) | Zero |
| C | 115 | Composition C (50 g) Viscous Crude Oil (50 g) | Zero |

Thus, having described the invention in detail, it will be understood by those skilled in the art that certain variations and modifications may be made without departing from the spirit and scope of the invention as defined herein and in the appended claims.

I claim:

1. A method for removing a water-soluble anionic surfactant from water, wherein the method comprises:
   (A) forming an emulsion of the following:
      (1) water containing the anionic surfactant,
      (2) an effective amount of a nonionic surfactant, said nonionic surfactant being selected from the group consisting of
         (a) alkoxylated alcohols wherein the alcohol moiety contains about 10 to about 20 carbon atoms, the alkoxy group contains about 2 to about 4 carbon atoms, and the number of alkoxy groups is in the range of about 10 to about 100, and
         (b) alkoxylated mono- or di-alkyl phenols wherein the alkyl group contains from about 8 to about 12 carbon atoms, the alkoxy groups contain about 2 to about 4 carbon atoms, and wherein there are about 20 to about 100 alkoxy groups, and
      (3) a hydrocarbon which is liquid at ambient temperature,
   (B) breaking the emulsion of step (A) thereby forming an aqueous layer and a hydrocarbon layer which contains the nonionic surfactant and substantially all of the anionic surfactant, and
   (C) separating the aqueous layer and the hydrocarbon layer,
   said method being characterized further in that
      (a) the anionic surfactant is selected from the group consisting of (i) alkali metal salts of alkaryl sulfonates, said sulfonates having equivalent weights in the range of about 250 to about 500 and (ii) alkali metal salts of fatty acids containing from 12 to 18 carbon atoms,
      (b) the amount of anionic surfactant in the water is in the range of about 0.001 to about 10 weight percent,
      (c) the amount of nonionic surfactant to anionic surfactant is in the range of about 0.1 to about 10 parts by weight, and
      (d) the amount of hydrocarbon to aqueous solution of anionic surfactant is in the range of about 0.1 to about 10 parts by volume.

2. The method of claim 1 wherein the anionic surfactant is a sodium alkylbenzene sulfonate.

3. The method of claim 2 wherein the nonionic surfactant is an alkoxylated alcohol wherein the alcohol moiety contains about 10 to about 20 carbon atoms, the alkoxy group contains about 2 to about 4 carbon atoms, and the number of alkoxy groups is in the range of about 10 to about 100.

4. The method of claim 3 wherein the alkoxy group is ethoxy.

5. The method of claim 4 wherein the alcohol moiety contains about 12 to about 14 carbon atoms and the number of alkoxy groups is about 30 to about 70.

6. The method of claim 2 wherein the nonionic surfactant is an alkoxylated mono- or di-alkyl phenol wherein the alkyl group contains from about 8 to about 12 carbon atoms, the alkoxy groups contain about 2 to about 4 carbon atoms, and wherein there are about 20 to about 100 alkoxy groups.

7. The method of claim 6 wherein the nonionic surfactant is an alkoxylated monoalkyl phenol wherein the alkoxy group is ethoxy and the number of alkoxy groups is in the range of about 30 to about 70.

8. The method of claims 2, 3, 4, 5, 6 or 7 wherein the hydrocarbon is crude oil.

9. The method of claim 1 wherein:
   (a) the amount of nonionic surfactant to anionic surfactant is about 0.5 to about 1 part by weight and
   (b) the amount of hydrocarbon to aqueous solution of anionic surfactant is about 0.5 to about 2 parts by volume.

10. The method of claim 9 wherein the anionic surfactant is a sodium alkylbenzene sulfonate.

11. The method of claim 10 wherein the nonionic surfactant is an alkoxylated alcohol wherein the alcohol moiety contains about 10 to about 20 carbon atoms, the alkoxy group contains about 2 to about 4 carbon atoms, and the number of alkoxy groups is in the range of about 10 to about 100.

12. The method of claim 11 wherein the alkoxy group is ethoxy.

13. The method of claim 12 wherein the alcohol moiety contains about 12 to about 14 carbon atoms and the number of alkoxy groups is about 30 to about 70.

14. The method of claim 10 wherein the nonionic surfactant is an alkoxylated mono- or di-alkyl phenol wherein the alkyl group contains from about 8 to about 12 carbon atoms, the alkoxy groups contain about 2 to about 4 carbon atoms, and wherein there are about 20 to about 100 alkoxy groups.

15. The method of claim 14 wherein the nonionic surfactant is an alkoxylated monoalkyl phenol wherein the alkoxy group is ethoxy and the number of alkoxy groups is in the range of about 30 to about 70.

16. The method of claims 9, 10, 11, 12, 13, 14 or 15 wherein the hydrocarbon is crude oil.

* * * * *